March 16, 1937. A. H. WOLF 2,073,861
GRINDING TOOL
Filed Dec. 23, 1935  3 Sheets-Sheet 1
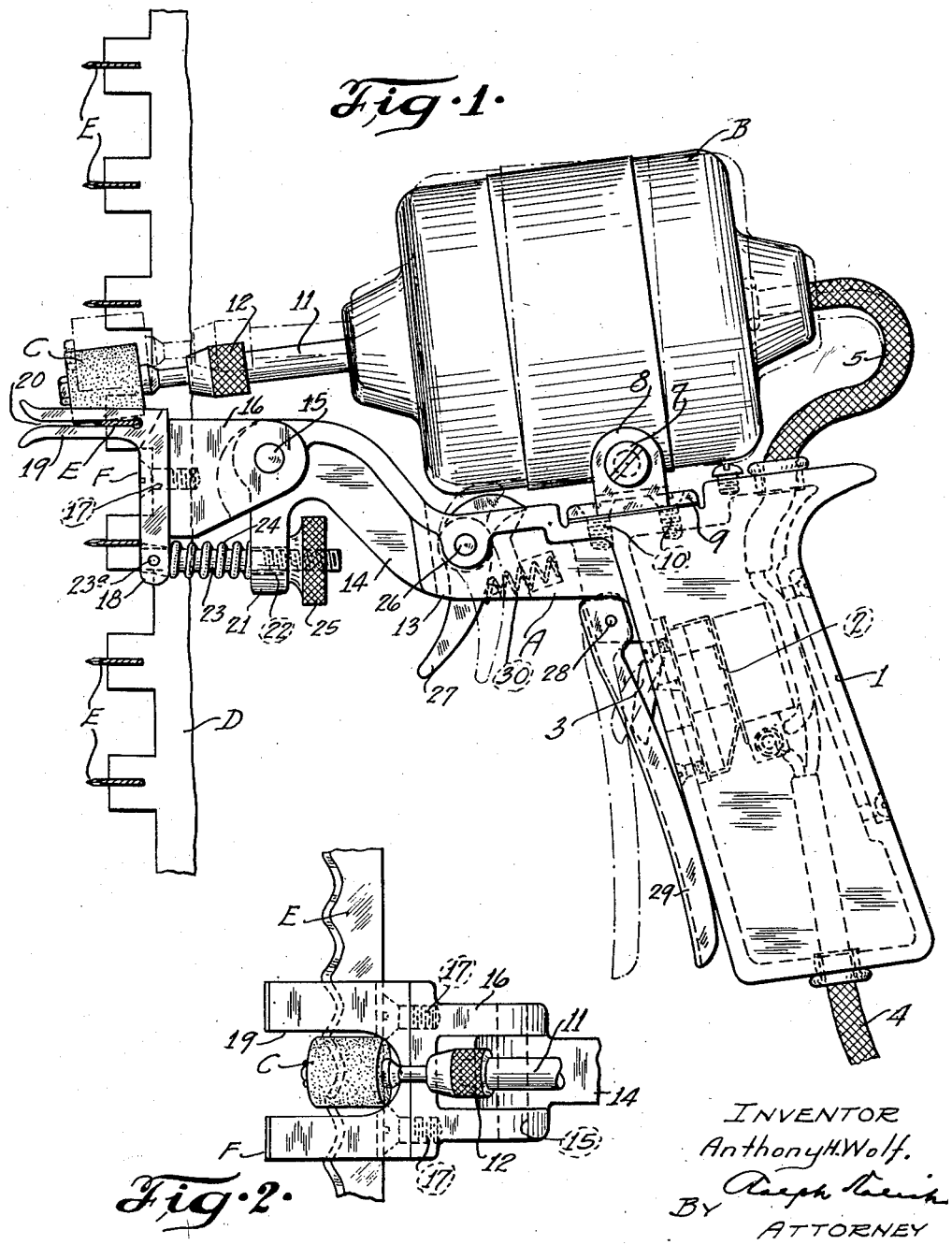
INVENTOR
Anthony H. Wolf.
BY
ATTORNEY

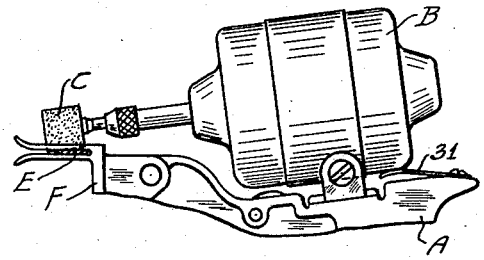
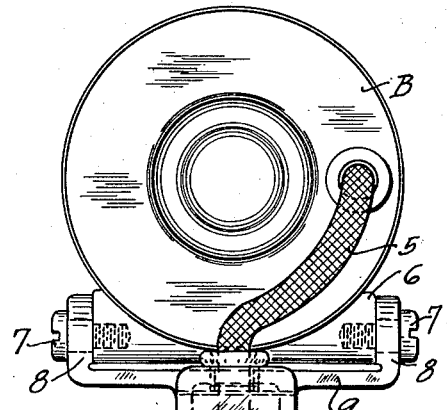
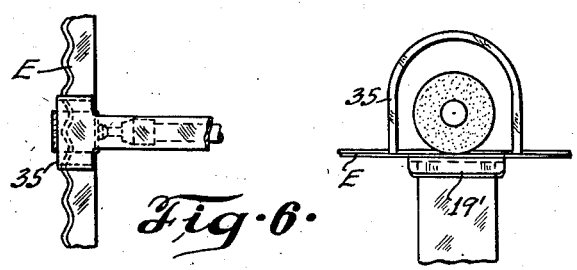
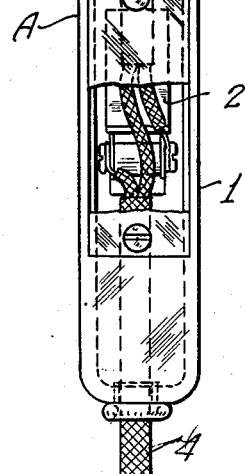
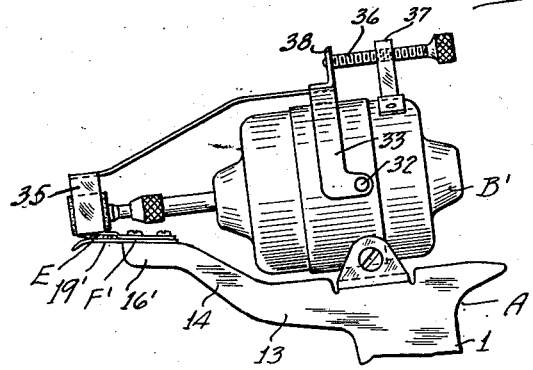

March 16, 1937.  A. H. WOLF  2,073,861
GRINDING TOOL
Filed Dec. 23, 1935  3 Sheets-Sheet 3

INVENTOR
Anthony H. Wolf.
BY
ATTORNEY

Patented Mar. 16, 1937

2,073,861

UNITED STATES PATENT OFFICE 2,073,861

GRINDING TOOL

Anthony H. Wolf, St. Louis, Mo., assignor to Papendick, Inc., St. Louis, Mo., a corporation of Missouri Application December 23, 1935, Serial No. 55,810

8 Claims. (Cl. 51—170)

This invention relates generally to grinding tools and, more particularly, to a certain new and useful improvement in manually-operable portable grinding tools especially adapted for sharpening the blades or knives of bread and other analogous slicing machines.

Machines of the class mentioned usually structurally include series of frame-mounted reciprocatory scalloped blades or cutters, and my present invention has generally for its object the provision of a tool readily portable and capable of convenient manual operation and manipulation for efficiently sharpening the scalloped cutting edges of such blades while in their supporting frames, and to improve generally upon the portable grinder illustrated in Letters Patent No. 1,961,328, of June 5, 1934.

And with the above and other objects in view, my invention resides in the novel features of form, construction, arrangement, and combination of parts presently described and pointed out in the claims.

In the accompanying drawings,—

Figure 1 is a side elevational view of a portable knife or blade grinding tool embodying my invention in preferred form, the tool being illustrated as in operable, grinding relation with a series of frame-supported blades;

Figure 2 is a fragmental plan view of the tool of Figure 1;

Figure 3 is a rear elevational view of the tool of Figure 1;

Figure 4 is a reduced fragmental side elevational view of a slightly modified grinding tool embodying my invention;

Figure 5 is a similar view of another slightly modified grinding tool embodying my invention;

Figures 6 and 7 are fragmental plan and front elevational views, respectively, of the tool of Figure 5;

Figure 8:
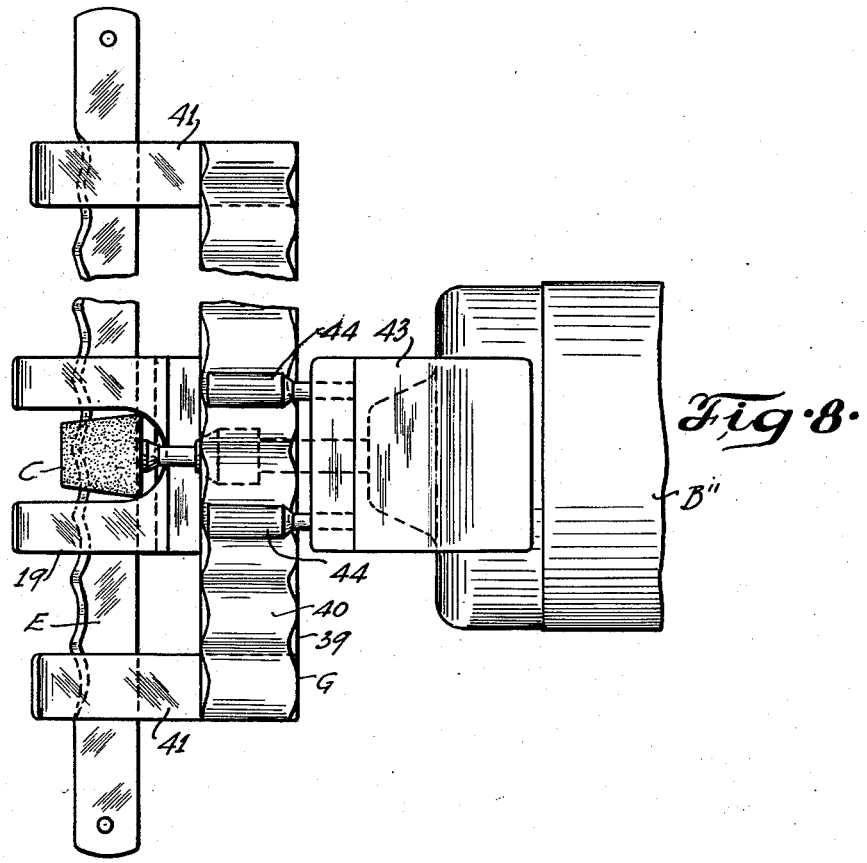
Figure 8 is a fragmental plan view of still another slightly modified grinding tool embodying my invention.

Referring now more in detail and by reference characters to the drawings, which illustrate practical embodiments of my invention, the tool includes a frame A, a portion I of which is in the form of a shell or casing preferably contoured, as shown, for convenient hand gripping. Suitably disposed and mounted within the shell or handgrip I, is any suitable electric-switch 2, forming part of which is a pivoted manipulating member 3 projecting forwardly exteriorly of the shell I. Electrically connected with switch 2 and adapted for electrical connection with any suitable source of current supply, are leads 4; and also electrically connected with switch 2 and leading from shell I for connection electrically with a suitable prime-mover, as, for instance, a relatively small electric motor B, are conducting wires 5, the motor B having a casing-enlargement or lug 6 disposed intermediate, and pivotally, as by studs 7, engaged with ears 8 presented upwardly from a plate or strip 9 forming part of, or fixed, as by screws 10, upon, the frame A, all as best seen in Figures 1 and 3.

The motor B is thus yieldingly mounted for swingable or oscillatory movement relatively to frame A and its gripping-shell or handle I, the shaft II of motor B being extended to suitably project forwardly over the frame A; and renewably mounted, as by means of a suitable chuck or other coupling member 12, on the forward end of shaft II, is a grinding-wheel or roll C preferably of conoidal formation or shape, as shown.

D designates a frame constructed, in practice, for removable mounting for reciprocation in the slicing machine, as will be well understood, and supported in and by the frame D, is a series of suitably spaced knives, cutters, or blades E, as they are variously termed in the industry, each preferably equipped with a cutting edge of scalloped formation, as best seen in Figure 2, for efficient, clean mechanical bread slicing.

Projecting forwardly from shell I and forming part of frame A, is a rigid arm 13 having an upwardly and forwardly projecting extension 14, and pivoted, as at 15, to and upon the free end of arm-extension 14, is a bracket 16, all as best seen in Figures 1 and 2.

Upon the front face of bracket 16, is flatwise disposed and fixed, as by screws 17, one leg or flange 18 of an angular member F, the other leg or flange 19 of member F being presented forwardly and being of bifurcated form, as shown best in Figure 2, for accommodating between the forks thereof the roll C during a blade-sharpening operation, the forks of leg 19 being, in turn, slotted or bifurcated, as at 20, for loosely gripping or engaging a blade E for guiding the tool therealong in the sharpening operation.

Projecting downwardly from the free end of arm-extension 14, is an ear 21 having an enlarged aperture or opening, as at 22, for loosely accommodating a short rod or pin 23 threaded at its rear end-portion and having hinged connection at its forward end, as at 23a, with the downwardly presented leg 18 of blade-engaging member F.

Coiled on the shank of pin 23 and impinging at its opposite ends against said leg 18 of member F and the ear 21, is a spring 24, and threaded for adjustment on the rearwardly presented end-portion of pin 23 and engaging the opposite face of ear 21, is a nut 25 for selectively pivotally shifting the member F for varying the angle of inclination of the engaged blade E relatively to the grinding-roll C.

Pivotally supported, as at 26, on the frame A, is a spring-pressed trigger 27 for engaging the motor B for swingably actuating the motor B for elevating its carried grinding-roll C from the engaged blade E, and also pivotally mounted, as at 28, on the frame A, is a second trigger 29 adapted for engagement with switch-tongue 3 for actuating the same, at the will of the operator, into "on" or "off" position for cutting the motor B into and out of its motivating circuit.

It will be noted that motor B is so yieldingly non-centrally pivoted on frame A that normally, under the pull of gravity or otherwise, the motor B takes at its forward portion a downwardly tilted position, with the result that the grinding roll C angularly engages with, and rollably rests on, the forwardly presented scalloped cutting-edge of the particular blade E.

Accordingly, in use and operation, the trigger 27 is, under finger-pull against the tension of spring 30, actuated to elevate the forward portion of motor B, and the member F at its bifurcated leg 19 engaged with a blade E, substantially as shown, and while the blade E is in mounted position in the frame D.

Trigger 27 is thereupon released, when the roll C peripherally engages the forwardly presented or cutting-edge of the engaged blade E, the desired angularity of the blade E relatively to the grinding-roll C being readily obtained through and by adjustments of the nut 25.

Motor B is thereupon, on actuation of trigger 29, cut into its motivating circuit, and as the tool is then manually shifted along the length of the engaged blade E, the scalloped edge of the blade, as will be evident, is quickly ground to the desired degree of sharpness, the tool being, in like manner, successively engaged with and manipulated upon the remaining blades E of the set, with the result that, through and by the tool, the entire series of blades E is, with a minimum of time and labor and without removal from the frame D, uniformly sharpened for efficient slicing operation, the motor B freely oscillating with the undulations of the scalloped cutting-edge of the blade E as the tool is manipulated therealong.

The tool of Figure 4 is identically similar to the tool of Figures 1-3, except that a leaf-spring 31 is mounted, as shown, on frame A for yieldingly urging the motor B in its forwardly and downwardly tilted position for grinding-roll engagement with the particular blade E.

In the grinder or tool of Figures 5, 6, and 7, the arm 14 includes a rigid forwardly elongated extension 16', upon which is fixed, as shown, a blade-engaging or tool-grinding member F' embodying merely a bifurcated and slotted plate 19' substantially similar to the leg 19 of member F. And partially encircling motor B' and pivoted thereon, as at 32, is an arcuate band or bail 33 provided with a strip 34 projecting forwardly over motor B' and equipped at its forward end with a rigid substantially inverted U-shaped hood 35 surrounding the grinding-roll C and adapted to rest at its ends, in the manipulations of the tool, on the engaged blade E for facilitating a following by the roll C of the undulations of the scalloped edge of the blade E as the tool is shifted therealong in a sharpening operation, the angularity of the hood 35 relatively to the engaged blade E being readily selected through and by adjustments of a threaded member 36 with brackets 37 and 38, respectively, upstanding from, and fixed to, the motor B' and the band 33.

Figure 9:
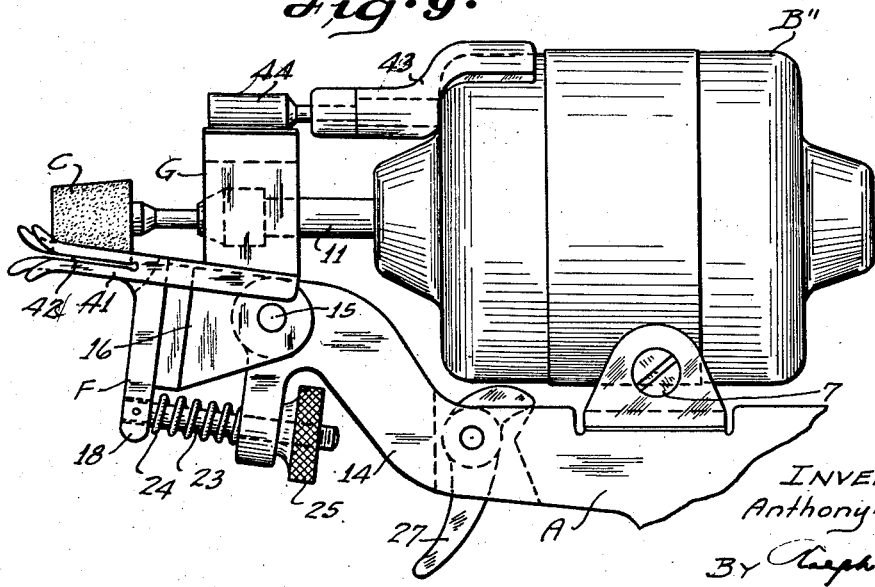
Figure 9 is a side elevational view of the tool of Figure 8.

The tool of Figures 8 and 9 is substantially similar to the tool of Figures 1, 2, and 3, except for the addition of other means for likewise facilitating a following by the grinding-roll C of the undulations of the scalloped cutting-edge of the engaged blade as the tool is manually shifted therealong in a sharpening operation.

In this instance, such means includes a skeleton frame G suitably fixed on bracket 16 and comprising a top-wall 39 disposed transversely of the tool and equipped with a series of corrugations, as at 40, having a pitch, as it may be said, corresponding to the pitch of the scallops of the cutting-edge of the blade E. Projecting forwardly from, and forming part of, frame G, are arms 41 slotted, as at 42, for engaging the blade E, and mounted, as at 43, on the motor B'', for rollably engaging the corrugations 40 for swingably shifting the motor B'' and its carried grinding-roll C as the tool is shifted along the blade E in a cutting-edge sharpening operation, is a pair of suitably spaced parallel rollers 44.

In each instance, the tool is efficient in the performance of its intended functions. The tool may be readily and inexpensively constructed and fulfills in every respect the object stated. And it is to be understood that changes in the form, construction, arrangement, and combination of the several parts of the grinder may be made and substituted for those herein shown and described without departing from the nature and principle of my invention.

Having thus described my invention, what I claim and desire to secure by Letters Patent is,—

1. A portable tool for blade-sharpening including, in combination, a frame having a hollow hand-grip and a forwardly projecting arm, a bifurcated guide-member on the arm having slotted registering portions for loosely fitting for movement on a blade to be sharpened, a motor mounted yieldingly on the frame for oscillatory movement and normally tilted relatively to the frame, an electric switch disposed within the hand-grip for electrical connection with the motor and a source of current supply, and a sharpening-roll carried by the motor-shaft for fitting the bifurcation of said member for angular grinding engagement with an edge of a blade in the manipulations of the tool.

2. A portable tool for blade-sharpening including, in combination, a frame having a hollow hand-grip and a forwardly projecting arm, a bifurcated guide-member on the arm having slotted registering portions for loosely fitting for movement on a blade to be sharpened, a motor mounted yieldingly on the frame for oscillatory movement and normally tilted relatively to the frame, an electric switch disposed within the hand-grip for electrical connection with the motor and a source of current supply, a sharpening-roll carried by the motor-shaft for fitting the bifurcation of said member for angular grinding engagement with an edge of a blade in the manipulations of the tool, and means adjacent the hand-grip for switch actuation.

3. A portable tool for blade-sharpening including, in combination, a frame having a hand-grip and a forwardly projecting arm, a bifurcated guide-member on the arm having slotted registering portions loosely fitting for movement on a blade to be sharpened, a motor mounted yieldingly on the frame for oscillatory movement and normally tilted relatively to the frame, a sharpening-roll carried by the motor-shaft for fitting the bifurcation of said member for angular grinding engagement with an edge of a blade in the manipulations of the tool, and means for reversely tilting the motor in the engagement and disengagement of said member with a blade.

4. A portable tool for blade-sharpening including, in combination, a frame having a hand-grip and a forwardly projecting arm, a bifurcated guide-member on the arm having slotted registering portions for loosely fitting for movement on a blade having a scalloped edge to be sharpened, a motor mounted yieldingly on the frame for oscillatory movement, a sharpening-roll carried by the motor-shaft for fitting the bifurcation of said member for grinding engagement with said edge of a blade in the manipulations of the tool, and means for oscillating the motor and its carried roll conformably with, and as the roll is shifted along, the scalloped edge of a blade.

5. A portable tool for blade-sharpening including, in combination, a frame having a hand-grip and a forwardly projecting arm, an angle bracket pivotally mounted for adjustment on the arm, a bifurcated member on one arm of the bracket whose arms are presented forwardly and registrably slotted for embracing a blade to be sharpened, a motor mounted on the frame, a sharpening-roll carried by the motor-shaft for fitting the bifurcation of said member for grinding engagement with an edge of an engaged blade in the manipulations of the tool, and means engageable with the other arm of the bracket for pivotally shifting the bracket for varying the angularity of the blade relatively to the roll.

6. A portable tool manually shiftable for blade-sharpening including, in combination, a frame having a hand grip and a forwardly projecting arm, a member supported on the arm having a forwardly opening slot for engaging a blade to be sharpened for guiding the tool therealong in a sharpening operation, an abrading roll for edge grinding engagement with an engaged blade, and a motor having a shaft engaged with the roll for roll-actuation, the motor being pivoted on the frame for rocking movement for accommodating, on tool-movement, undulations in an engaged blade.

7. A portable tool manually shiftable for blade-sharpening including, in combination, a frame having a hand grip and a forwardly projecting arm, a bifurcated member on the arm having forwardly opening slotted registering portions for loosely fitting on a blade to be sharpened for guiding the tool therealong in a sharpening operation, an abrading roll for fitting the bifurcation of said member for grinding engagement with an edge of an engaged blade, and a motor having a shaft engaged with the roll for roll-actuation, the motor being pivoted on the frame for rocking movement for accommodating, on tool-movement, undulations in an engaged blade.

8. A portable tool manually shiftable for blade-sharpening including, in combination, a frame having a hand grip and a forwardly projecting arm, a bifurcated member on the arm having forwardly opening slotted registering portions for loosely fitting on a blade to be sharpened for guiding the tool therealong in a sharpening operation, an abrading roll for fitting the bifurcation of said member for grinding engagement with an edge of an engaged blade, and a motor having a shaft engaged with the roll for roll-actuation, the motor being pivoted on the frame for normally obliquely presenting its shaft to the engaged blade and being rockable for accommodating, on tool-movement, undulations in an engaged blade.

ANTHONY H. WOLF.